United States Patent Office 2,956,831
Patented Oct. 18, 1960

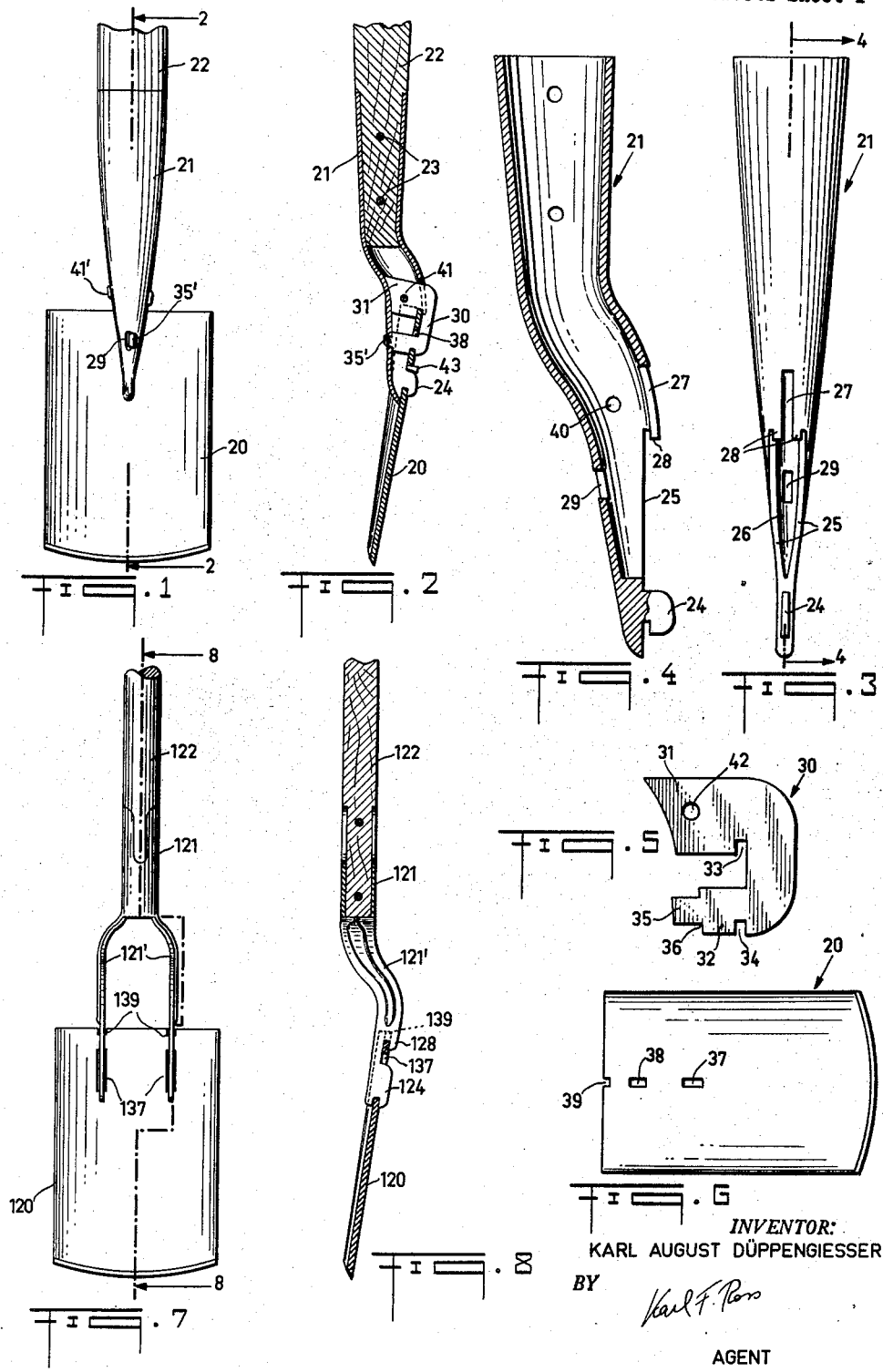

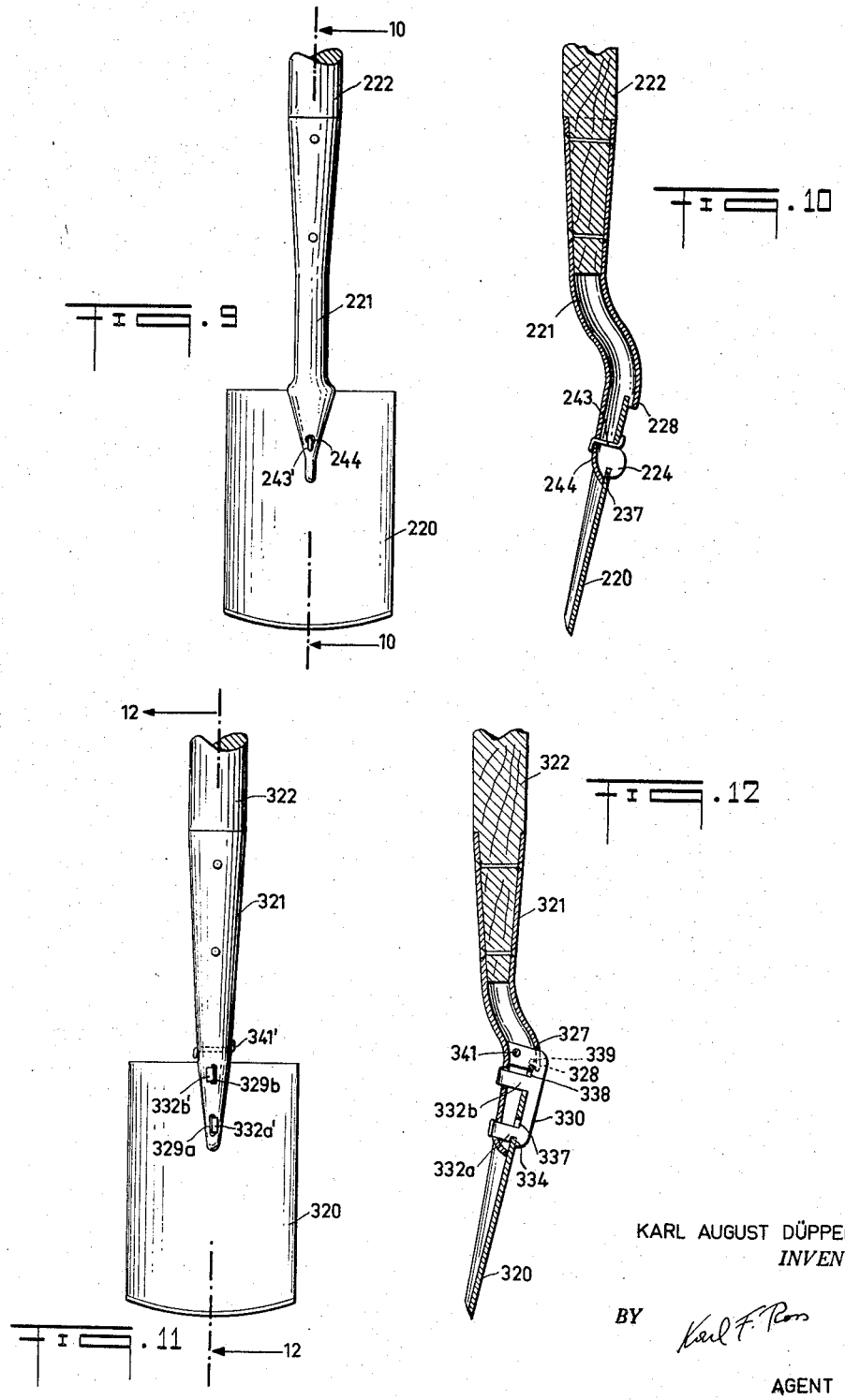

2,956,831

SOIL-WORKING IMPLEMENT

Karl August Düppengiesser, Gera-Langenberg, Thuringia, Germany

Filed Jan. 14, 1957, Ser. No. 633,901

3 Claims. (Cl. 294—57)

My present invention relates to a soil-working implement, such as a spade or a shovel, having a blade with a socket adapted to receive a (usually wooden) handle.

Implements of this description are known wherein the blade and the socket are formed integral with each other; a disadvantage of this construction is the complexity of the tools and dies required in its manufacture and the substantial amount of waste unavoidably encountered in production. It is also known to form a rigid connection between blade and socket by riveting or welding; a drawback of the latter type of joint is its tendency to form cracks at the welding seams resulting in the early deterioration of the implement, whereas riveted joints interfere with the insertion of the implement into the ground and, especially in the presence of moist or loamy soil, readily become clogged with dirt. In either of these cases it is, moreover, necessary to form the socket halves in a particular interfitting manner involving relatively wasteful methods of manufacture.

A principal object of the present invention is to provide an implement of the character set forth wherein the aforementioned disadvantages are obviated.

Another object of this invention is to provide an implement of this character wherein socket and blade are detachably fitted together in a manner enabling ready separation of the parts, so that either the blade or the socket may be conveniently replaced when damaged or worn, while insuring a rigid connection therebetween during normal use of the implement.

The above objects are realized, in accordance with my invention, by the provision of a soil-working implement whose blade is formed with one or more slots adapted to receive, in interlocking relationship, tongue-like formations engaging the socket member; the latter is additionally provided with a projection adapted to enter a notch in the upper edge of the blade and positively to lock the socket member to the blade. The tongue-like formations may be part of the socket member itself or of a link member arranged to be detachably secured to the former.

The invention will be described in greater detail with reference to the accompanying drawing in which:

Fig. 1 is a front view of the working end of a spade embodying the invention;

Fig. 2 is a sectional view taken on the line 2—2 of Fig. 1;

Fig. 3 is an enlarged rear view of the socket member forming part of the spade of Figs. 1 and 2;

Fig. 4 is a sectional view taken on the line 4—4 of Fig. 3;

Fig. 5 is an elevational view of a link member forming part of the spade of Figs. 1 and 2;

Fig. 6 is a plan view of the blade portion of the spade shown in Figs. 1 and 2;

Fig. 7 is a view similar to Fig. 1, showing another form of spade according to the invention;

Fig. 8 is a sectional view taken on the line 8—8 of Fig. 7;

Fig. 9 is a further view similar to Fig. 1, illustrating a modification of the embodiment of Fig. 7;

Fig. 10 is a sectional view taken on the line 10—10 of Fig. 9;

Fig. 11 is still another view similar to Fig. 1, showing a further embodiment of the invention; and Fig. 12 is a sectional view taken on the line 12—12 of Fig. 11.

In Figs. 1 and 2 there is shown the lower or working end of a spade whose principal parts are a blade 20, a socket member 21 and a wooden handle 22 secured, as by pins 23, to the member 21. The latter, of tubular configuration, tapers toward the bottom where it forms a tip carrying a rearwardly projecting lug 24. The lower part of socket 21 is cut open at the rear to form shoulders 25 flanking an aperture 26 which communicates with a vertical slot 27 formed in a rearward portion of the socket wall; the lower end of this portion constitutes a pair of prongs 28 overhanging the shoulders 25. A slot 29 is cut in a forward portion of the socket wall opposite aperture 26.

A link member 30, die-cut from a flat piece of sheet metal, comprises an upper arm 31 and a lower arm 32 separated from each other by a gap which terminates in an upwardly directed recess or notch 33. Aligned with recess 33 is a similar recess 34 cut into the lower periphery of member 30. Lower arm 32 has an extension 35 projecting beyond a shoulder 36.

The blade 20 is formed along its vertical axis with a pair of slots 37, 38 and a notch 39 cut into the normally upper edge of the blade (shown at left in Fig. 6). Slot 37 is adapted to receive the lug 24 of socket member 21; slot 38 is adapted to receive the lower arm of link 30, the extension 35 of this arm then passing through aperture 26 and slot 29 while the upper link arm 31 traverses the slot 27 of the socket member. When the parts are thus assembled, the connection between link 30 and socket 21 may be secured by driving a bolt or pin 41 through holes 40 in the socket and an aligned hole 42 in the link, whereupon the ends of the pin may be bent as shown at 41', and by bending-over the projecting end of extension 35 as illustrated at 35'. By tapping the blade 20 from below, the blade is caused to assume the position illustrated in Fig. 2 in which the prongs 28 and the lug 24 engage its rear face and the notches 33, 39 interlock, as do the recess 34 and the lower part of slot 37. A small shim 43 may be wedged into the clearance left by slot 38 above lug 24 in order to maintain the blade 20 in its elevated position; this precaution, however, will not be absolutely necessary since the blade will be held quite firmly by friction and since the normal use of the spade will tend to push the blade even further up toward the handle.

In Figs. 7 and 8 I have shown a simplified embodiment in which the link member of Fig. 5 has been omitted. Here the blade 120 is formed with two laterally offset, parallel slots 137 and with two marginal notches 139 in alignment therewith. Socket member 121, which holds handle 122, has its lower end bifurcated so as to form two legs 121' each provided with an overhanging prong 128 and with a lug 124 similar to the analogously designated elements in Figs. 2–4. When the parts are assembled, the lugs 124 are slipped into slots 137 and the blade 120 is pushed upwardly under the overhanging prongs 128 which interlock with the notches 139. The clearances left at the top of slots 137 may again be occupied by wedge pieces such as the shim 43 (Fig. 2).

In Figs. 9 and 10 I have shown a spade which combines features of the preceding embodiments. Blade 220 is here provided with a single central slot 237; socket member 221 is not bifurcated but pointed, as in Figs.

1–4, and provided with a rearwardly projecting lug 224 above which there is formed an overhanging, unslotted prong portion 228. After the lug 224 has been introduced into slot 237 and the blade 220 has been driven upward into engagement with prong 228, a blocking element in the form of a pin 243 is inserted through the upper part of slot 237 and through a hole 244 provided in alignment therewith in the forward wall portion of socket 221. The ends of pin 243 are then bent over as indicated at 243'. The spade handle has been designated 222.

The embodiment of Figs. 11 and 12 is similar to that of Figs. 1–6, a major difference being the provision of two lower arms 332a, 332b on link member 330 in addition to an upper arm 331. Arms 332a, 332b pass through slots 337, 338 in blade 320 and through slots 329a, 329b in socket member 321, respectively, and have their extremities bent over as indicated at 332a', 332b'. Prongs 328, separated by a slot 327 adapted to receive the upper end of link 330, interlink with notch 339 at the top of blade 320. Pin 341 interconnects link member 330 and socket member 321, its ends being secured by bending as at 341'. When the blade is pounded against the ground or otherwise driven upwardly with respect to handle 322, it enters a notch 334 on the underside of link 330 as well as a pair of recesses adjacent prongs 328 for a firmer interlinking of the parts, as in the first-described embodiment.

The invention is, of course, not limited to the specific constructions described and illustrated but may be realized in various modifications and adaptations without departing from the spirit and scope of the appended claims.

I claim:

1. A soil-working implement comprising a blade, a handle, a socket for said handle, said socket having a tubular extension formed with an opening substantially closed by a portion of said blade, said blade including an acute angle with the axis of said extension and being provided at said portion with a slot facing a similar slot in an opposite part of said extension, a flat link member passing through said extension in a plane containing said axis and lying perpendicular to said blade, said link member having a first arm passing around an edge of said blade into contact with said opposite part and a second arm traversing said slots in interlocking relationship with said blade and said extension, one of said arms being provided with a hole, and a bolt anchored to said extension and passing with a close fit through said hole in a direction transverse to said link member.

2. An implement according to claim 1 wherein said extension has a pair of prongs straddling said first arm and reaching around said edge into contact with the rear face of said blade.

3. An implement according to claim 1, wherein said blade is formed with a further slot, said socket having an integral lug beyond said extension interlockingly engaging said further slot.

References Cited in the file of this patent

UNITED STATES PATENTS

| 110,126 | Fairley | Dec. 13, 1870 |
| 628,202 | Laws | July 4, 1899 |
| 821,847 | Arnavat | May 29, 1906 |
| 832,267 | Cook | Oct. 2, 1906 |
| 1,204,332 | Archer | Nov. 7, 1916 |
| 1,211,175 | Kinzel | Jan. 2, 1917 |
| 1,261,638 | Southwell | Apr. 2, 1918 |
| 1,312,766 | Surbaugh | Aug. 12, 1919 |
| 1,475,899 | Thibault et al. | Nov. 27, 1923 |
| 1,749,103 | Kortick | Mar. 4, 1930 |

FOREIGN PATENTS

| 389,085 | France | Aug. 31, 1908 |
| 309,450 | Germany | July 18, 1917 |
| 761 | Great Britain | Mar. 14, 1866 |
| 7,544 | Great Britain | May 10, 1884 |
| 9,455 | Great Britain | June 4, 1891 |
| 16,685 | Great Britain | Dec. 19, 1884 |
| 133,477 | Great Britain | Oct. 16, 1919 |
| 86,241 | Switzerland | Aug. 16, 1920 |